(No Model.)
W. A. HEYWOOD.
HAME STAPLE.
No. 338,073.  Patented Mar. 16, 1886.
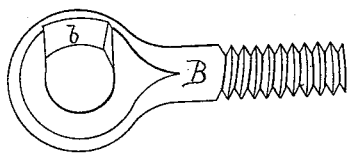
Fig. 5.
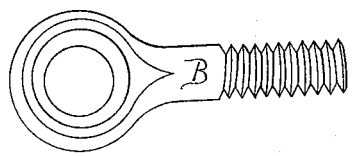
Fig. 4.
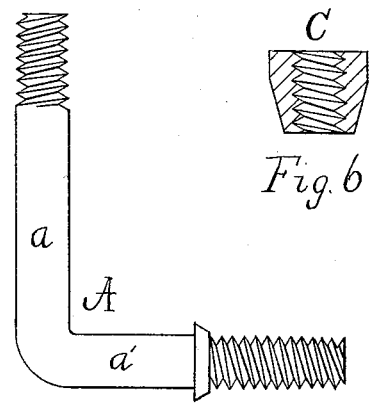
Fig. 6.
Fig. 3.
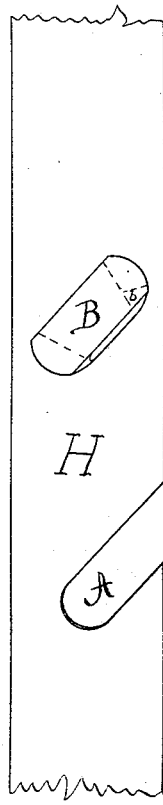
Fig. 7.
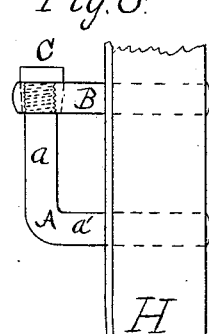
Fig. 2.
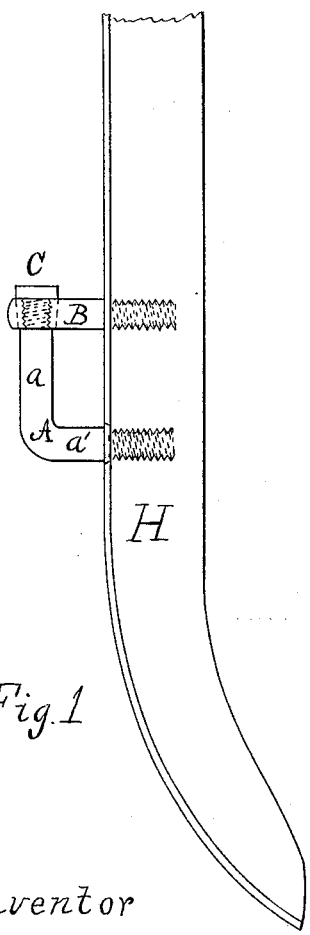
Fig. 1.
Witnesses
W. H. Harlow
Geo. G. Barker
Inventor
Warren A. Heywood
By J. R. Mason Atty

UNITED STATES PATENT OFFICE.

WARREN A. HEYWOOD, OF BUCKSPORT, MAINE.

HAME-STAPLE.

SPECIFICATION forming part of Letters Patent No. 338,073, dated March 16, 1886.

Application filed December 17, 1885. Serial No. 185,989. (No model.)

*To all whom it may concern:*

Be it known that I, WARREN A. HEYWOOD, a citizen of the United States, residing at Bucksport, county of Hancock, State of Maine, have invented a new and useful Hame-Staple, of which the following is a specification.

My invention relates to an improved hame-staple, and is illustrated in the accompanying drawings, in which—

Figure 1 is a side elevation of my staple as applied to a hame. Fig. 2 is a modified form of the same. Fig. 3 is a side elevation of elbow forming part of staple. Fig. 4 is a perspective view showing the top of eyebolt forming part of staple. Fig. 5 is a perspective view showing the bottom of eyebolt forming part of staple. Fig. 6 is a vertical section of nut. Fig. 7 is a perspective view of hame and staple, indicating the method of operating my staple.

Similar letters refer to corresponding parts throughout the figures.

My object is to provide a device whereby the draft or trace may be removably attached to the hames, and is accomplished by the peculiar form of staple below described.

My staple is formed of the bent bar or elbow A and eyebolt B, secured together, when in position, by the nut C. Each part is of peculiar construction, and will be described in detail.

The elbow A is formed of a bar of metal bent substantially at a right angle, thus forming the arms $a$ and $a'$. The external ends of both these arms are preferably screw-threaded, and the shorter arm, $a'$, is adapted to be screwed partially through the outer side of the hame H and leave a portion of its length projecting outside the hame when so screwed into position, as shown in Fig. 1. (The smooth portion of the arm $a$ is made as long as or slightly longer than the width of the draft or trace, and the smooth portion of the arm $a'$ slightly longer than the thickness of the draft.)

The eyebolt B has a shank with screw-threaded point, and has its eye countersunk upon the side used uppermost when the parts of the staple are in position, and one side wall of the under side of the eye is notched, slotted, or cut away at $b$, as shown in Fig. 5.

The nut C has a square or angular top extending downward sufficiently to admit of the application of a wrench, and from thence to its bottom its sides are conically countersunk to correspond with the countersink in the upper side of the eye of the eyebolt B.

The operation of my device is as follows: The part $a'$ of the elbow A is screwed into the hame H. The eyebolt B is also screwed into the hame in such position thereon with reference to the elbow A that the part $a$ of said elbow, when adjusted, shall pass through the eye, or nearly through it. The adjustment of these parts could not, however, be effected properly with the ordinary form of eyebolt, and it is to meet this difficulty that I form the notch $b$ in the eye of the eyebolt B, by means of which the parts may be adjusted as follows, and as shown in Fig. 7: The elbow A is turned down and away from the slotted side of the eyebolt B and the eyebolt rotated slightly, about one-sixth of a complete revolution, so as to elevate the slotted under side of the eye. The loop of the draft or trace is then slipped over the arm $a$ of the elbow A, and the elbow A turned upward until its arm $a$ is substantially parallel with the hame H and the tip of the arm $a$ rests against the farther and lower side of the eye, the threaded point of the arm $a$ traversing in its passage the slot $b$ in the eye. The eyebolt B is then rotated backward, and its eye closes over and surrounds the external end of the arm $a$, which will then project upward through or partially through said eye. The nut C is then screwed down upon the threaded point of the arm $a$, the countersink of the nut fitting into the countersink of the eye, and the angular head of the nut projecting above the top of the eye sufficiently to allow the application of a wrench. To remove the draft or trace, the operation is reversed, the steps being as follows: The nut is unscrewed and removed, the eyebolt rotated, and the arm $a$ turned down and away from the eyebolt, when the draft can readily be removed.

If at any time the parts become loose, they may be instantly tightened by a turn of the nut.

Various modifications of my device, not, however, affecting its principle, are apparent. The points of the eyebolt B and the arm $a'$ of the elbow A may be made round without screw-threading, and may be carried entirely through the hame and riveted on the back side thereof, as shown in Fig. 2, care being taken so to fit them in the hame as to allow for sufficient rotation, as above described.

By means of my invention the draft or trace may be easily and quickly secured to the hame and as quickly and easily detached therefrom. If the draft be injured, it may be detached and repaired entirely separate from the hame, and if the staple or hame be injured they may be repaired separately from the draft.

Having thus described my invention, what I claim, and desire to secure by Letters Patent, is—

1. The herein-described hame-staple, consisting of the elbow A, eyebolt B, having its eye notched or slotted, as at b, and nut C, substantially as described.

2. In combination with a hame, the herein-described staple, consisting of the elbow A, eyebolt B, having its eye notched or slotted, as at b, and nut C, substantially as described.

WARREN A. HEYWOOD.

Witnesses:
O. P. CUNNINGHAM,
CHAS. H. RICE.